United States Patent [19]

Plate

[11] Patent Number: 4,513,850

[45] Date of Patent: Apr. 30, 1985

[54] ELECTROHYDRAULIC POWER SHIFT TRANSMISSION SYSTEM

[75] Inventor: John R. Plate, Milwaukee, Wis.

[73] Assignee: Allis-Chalmers Corporation, Milwaukee, Wis.

[21] Appl. No.: 465,156

[22] Filed: Feb. 9, 1983

[51] Int. Cl.³ .................. F16D 25/10; F16D 25/11
[52] U.S. Cl. .................. 192/3.58; 192/48.9;
     192/87.14; 91/529; 91/530
[58] Field of Search .......... 192/48.9, 85 R, 87.14,
     192/109 F, 3.57, 3.58; 91/459, 529, 530

[56] References Cited

U.S. PATENT DOCUMENTS

| 3,382,769 | 5/1968 | Raider | 91/459 |
| 3,808,810 | 5/1974 | Schott et al. | 60/416 |
| 4,376,473 | 3/1983 | Tomasek et al. | 192/3.58 |
| 4,380,278 | 4/1983 | Lasken | 192/3.58 |
| 4,416,358 | 11/1983 | Kapp | 192/3.58 |

Primary Examiner—Rodney H. Bonck
Assistant Examiner—Richard M. Lorence
Attorney, Agent, or Firm—Charles L. Schwab

[57] ABSTRACT

An electrohydraulic control system for a pair of hydraulically actuated vehicle transmission clutches operable to effect high and low speed ranges. High and low hydraulic clutch valves are pilot operated by a solenoid valve which delivers pressurized fluid to pressure chambers associated with the flow control elements of the clutch valves. The solenoid valve is controlled by a circuit which includes a relay operated switch, a manually operated switch controlling the relay operated switch and a clutch pedal operated switch in series with the manually operated switch. The relay operated switch opens when the clutch pedal is operated thereby causing the transmission to be in a low speed condition when inching the vehicle.

2 Claims, 7 Drawing Figures

ELECTROHYDRAULIC POWER SHIFT TRANSMISSION SYSTEM

This invention relates to a power shift transmission and, more particularly, to a solenoid operated directional valve selectively operating modulating valves for the high/low ranges of the transmission and automatic downshifting of the power shift transmission when the control valve is in the inching position.

Power shift transmissions operate by selectively shifting hydraulic clutches for selectively engaging and disengaging speed ratios. Shifting can be accomplished while the vehicle is moving since a degree of slippage between the friction disks on the hydraulic clutch is tolerated. A combination of a power shift transmission and a manually operated transmission have been used whereby the manual transmission provides a multiple of gear speeds and the power shift transmission provides the added advantage of upshifting and downshifting, while the vehicle is moving. The size of the transmission can be kept relatively small by the use of this combination and still provide a multiple speed transmission. Some operations require a slow operation, commonly known as inching, and this is usually provided in the low speed range of the manual transmission. Accordingly, the power shift transmission will provide smoother control without jerkiness and avoid possible damage to the clutch if the transmission is downshifted as the clutch pedal is operated for inching. The downshifting of the power shift transmission has been accomplished mechanically or hydraulically when the clutch pedal is operated. Accordingly, the applicant has provided for downshifting of the power shift transmission to the low speed range when the vehicle clutch is operated for inching. The downshift is operated electrically through a switch associated with the clutch pedal so that the switch opens responsive to operation of the clutch pedal. A normally closed solenoid valve switch associated with the clutch pedal operates to engage the high speed clutch in the power shift transmission when the manual clutch is engaged and the manual switch is in the high position. When the manual clutch pedal is depressed the switch is in the circuit opens and a spring shifts the directional solenoid valve to the low speed position. The low speed clutch will be engaged when the clutch pedal is released. The clutch pedal and the clutch control valve provide manual modulation of the hydraulic fluid to the clutch, which is known as inching.

Reference may be made to the Schott et al patent, U.S. Pat. No. 3,808,810, which shows a directional valve controlling the operation of two modulating valves for a power shift transmission. Downshifting by the directional valve is accomplished through hydraulic fluid from the control valve when the clutch pedal is operated. The transmission is downshifted to engage the low speed hydraulic clutch through the modulating valve during the inching operation. Downshifting is accomplished hydraulically.

The applicant's invention provides a similar two speed power shift transmission in which the control for the directional valve is through an electrical switch associated with the clutch pedal. The switch is normally closed when the clutch pedal is in its nondepressed condition. As the clutch pedal is operated the circuit is opened and a spring in the solenoid operated directional valve shifts the directional valve to engage the low speed modulating valve to engage the low speed clutch.

It is an object of this invention to provide an electrohydraulically operated power shift transmission having an electrical control associated with the engine clutch pedal to downshift the power shift transmission into the low speed range when the pedal is operated.

It is another object of this invention to provide an electrically operated directional valve on a power shift transmission for automatic downshifting of the power shift transmission to the low speed range when the clutch pedal is operated.

It is a further object of this invention to provide a power shift transmission with an electrically operated power shift selective spool to selectively operate the low speed modulating valve of high/low speed ranges when the manual clutch is operated for inching of the vehicle.

The objects of this invention are accomplished in a multiple speed vehicle transmission having a power shift to automatically downshift when the manual clutch is operated for inching. An electrical control, operating responsive to movement of the manual clutch pedal, selectively operates a solenoid operated directional valve to selectively engage the low speed modulating valve. When the clutch is operated the switch opens to downshift the directional valve and engage the low speed range of the power shift transmission. The directional valve is solenoid operated providing communication between the control valve and the low speed modulating valve to engage the low speed hydraulic clutch in the power shift transmission.

Referring to the drawings the preferred embodiment of this invention is illustrated.

Figure 1:
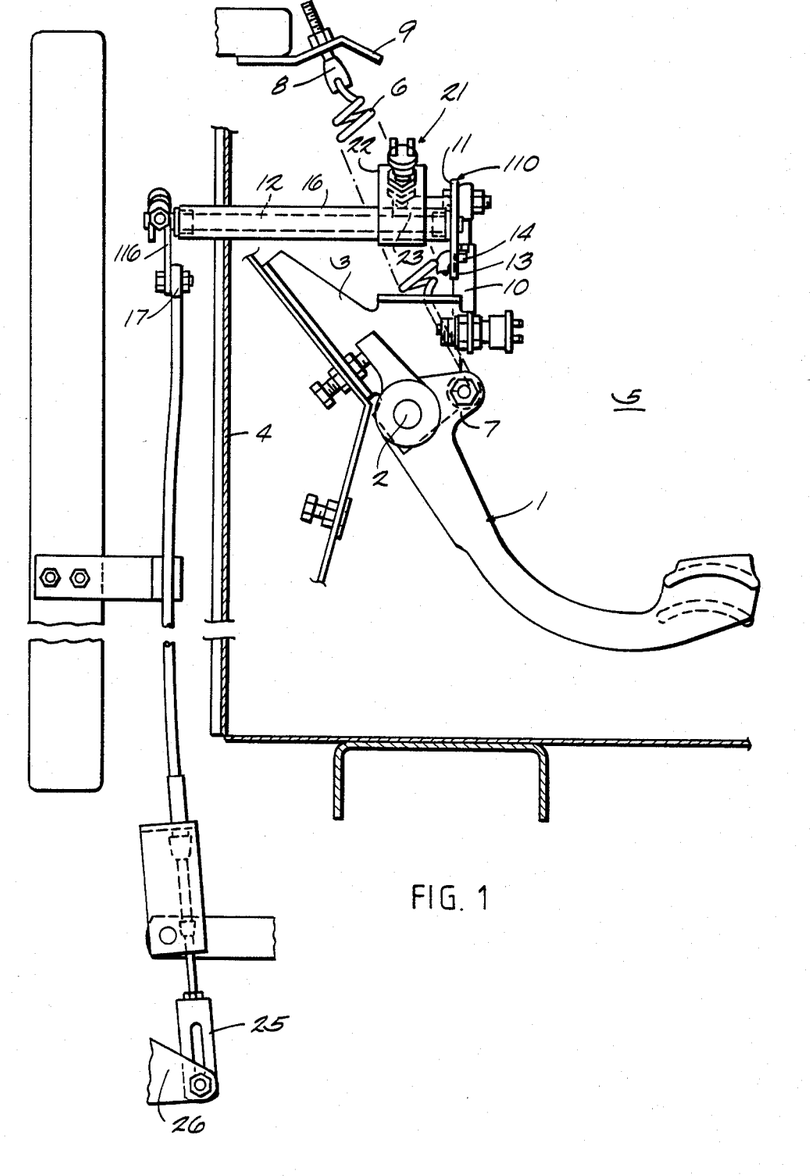
FIG. 1 illustrates a side elevation view of the clutch pedal mounted at the operator station in a tractor.
Figure 2:
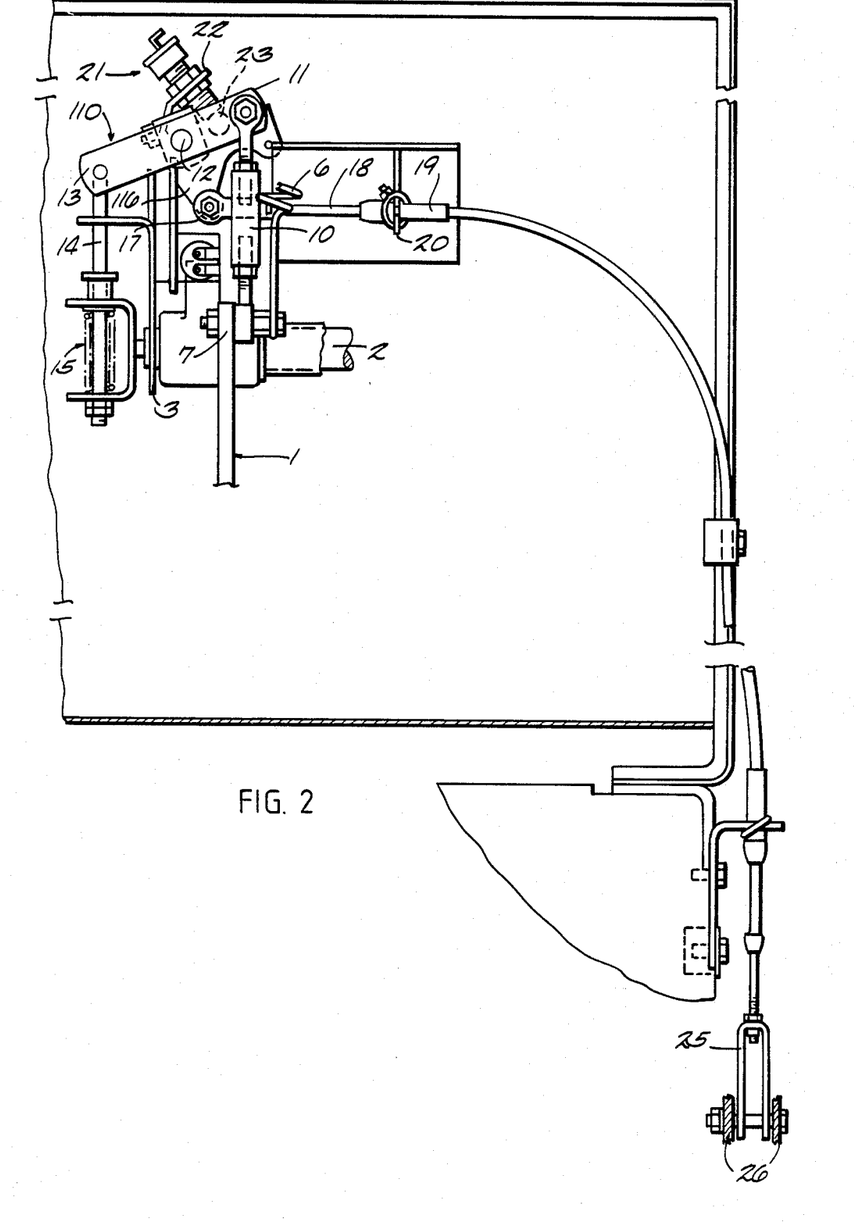
FIG. 2 is a rear view of the clutch pedal and control linkage as shown in FIG. 1.

Referring to FIGS. 1 and 2 of the drawings, the clutch pedal 1 is pivotally mounted on a shaft 2 which is carried on a support bracket 3 carried on the fire wall 4 at the operator station 5. The clutch pedal 1 is biased to a return position by the return spring 6 connected to an arm 7 of the clutch pedal 1 and a spring seat 8 on the bracket 9 supported on the fire wall 4. The arm 7 is pivotally connected to a link 10 which in turn is pivotally connected to an arm 11 of lever 110. The lever 110 is pivotally mounted on a fore and aft shaft 12. The lever 110 is also formed with an arm 13 pivotally connected to a link 14 which operates in a dampening device 15 which is also carried on a bracket 3 supported on the fire wall 4. The shaft 12 extends through the bearing 16 and through the fire wall 4 and carries an arm 116. The arm 116 is pivotally connected through a clevis 17 to the sheathed cable 18 reciprocating in the sheath 19. The sheath 19 is mounted on the anchor 20. Electrical switch 21 is mounted on the bracket 22 and operated by an abutment 23. Normally this switch 21 is closed when the clutch pedal 1 is in the retracted or up position. The switch opens when the clutch pedal 1 is depressed. The sheathed inner cable 18 extends downwardly to the clevis 25 which is pivotally connected to the lever 26.

Figure 3:
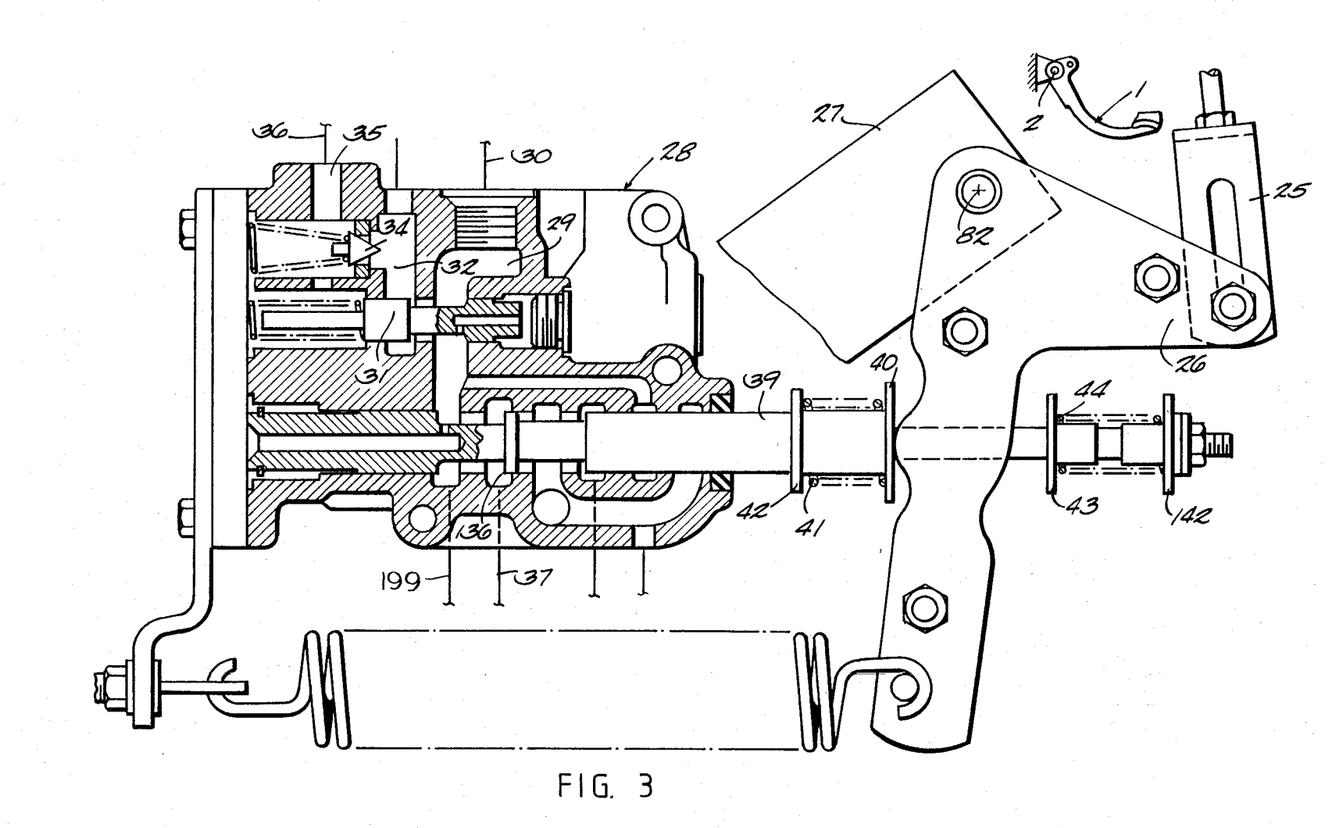
FIG. 3 is a side elevation view partially in cross-section of the manually operated control valve in the retracted position.

Referring to FIGS. 3, 4, 5, 6 and 7, the lever 26 is pivotally mounted on a bracket 27 supported on a fluid supply control valve 28. The control valve 28 defines a pressure chamber 29 in communication with a conduit 30 which is connected to the pump 90. The chamber 29 is connected to a relief valve 31 allowing fluid to pass through the chamber 32 to a cooler 93, filter 94 and to sump 92. Likewise, the relief valve 34 allows fluid to pass through the sump chamber 35 and through conduit 36 to sump 92 when oil is cold. The chamber 29, as shown in FIG. 3, is in communication with the chamber 136 which is in communication through the conduit 199 to directional valve 45 and modulating valves 47 and 48 for operating clutches and a brake. A fluid flow control element in the form of a spool 39 is mechanically operated by the lever 26 operating against the spring seat 40 biasing a spring 41 against spool flange 42. The flanges 142 and 43 compress spring 44 for operation of the spool for overtravel protection.

The fluid supply valve 28 is hydraulically connected to the the valve housing 46 which houses a pilot operated low speed modulating valve 47 and a pilot operated high speed modulating valve 48. A directional valve 45 secured to the housing 46 includes a solenoid 49 having a coil 51 and electrical terminals 52 and 53 for connecting the solenoid valve in an electrical circuit which will subsequently be described. The low speed range modulating valve 47 is shown in operation in FIG. 6 in which the accumulator 54 forms an expansible chamber 55. The plunger or piston 56 is biased to a minimum volume position by the spring 57. The spool spring 58 also biases the spool 59 in the left-hand direction. The reducing valve 60 includes a flow control element or spool 59 which has a central opening 61 and radial opening 62 to allow pressurized fluid from conduit 37 and chamber 63 to flow into the pressure reducing valve 60. Fluid in the pressure chamber 63 is allowed to flow through the radial opening 62 in the central opening 61 and out of the conduit 64 to the low speed hydraulic clutch 65. Similarly, an accumulator 66, which includes the plunger or piston 67, is biased to a minimum volume position by the spring 68 to form a variable volume chamber 69. A flow control element or spool 70 for controlling the flow of fluid to and from the high speed clutch 75 is also biased in the left-hand direction by the spool spring 71 for connecting the high speed clutch 75 to sump. A radial port 72 is open in the position shown in FIG. 4 for the high speed modulating valve 48. The central opening 73 is in communication with the conduit 74 and the high speed clutch 75. Thus, in the high speed condition of adjustment of the directional valve 45, the high speed clutch 75 is supplied pressure fluid and the low speed clutch 65 is vented to sump.

Figure 4:
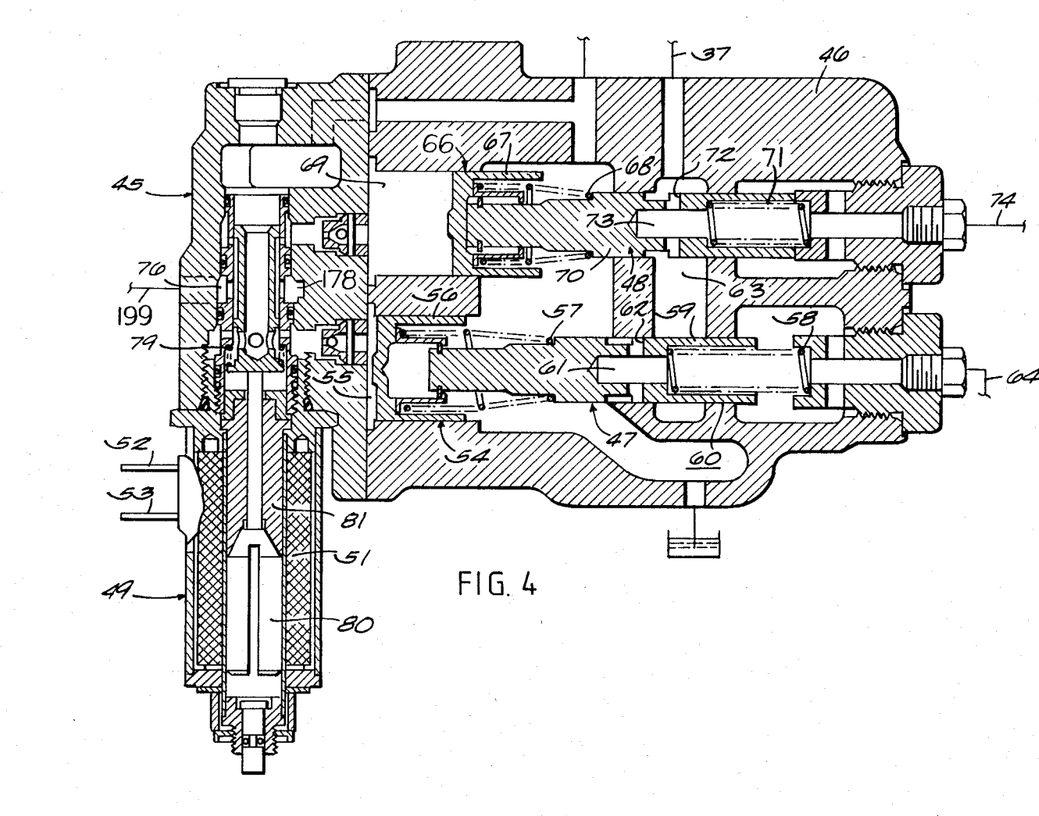
FIG. 4 is a cross-section view of the directional valve and two modulating valves with the high speed modulating valve in operation.

The directional valve 45 is a solenoid operated valve and pressurized fluid in conduit 199 flows to the pressure chamber 76. In the position as shown in FIG. 4, pressurized fluid in chamber 76 is allowed to flow through the passage 178 to the expansible chamber 69. A solenoid valve is held in this position responsive to the solenoid coil 51 which is energized and the armature 80 is drawn to the core 81.

Figure 5:
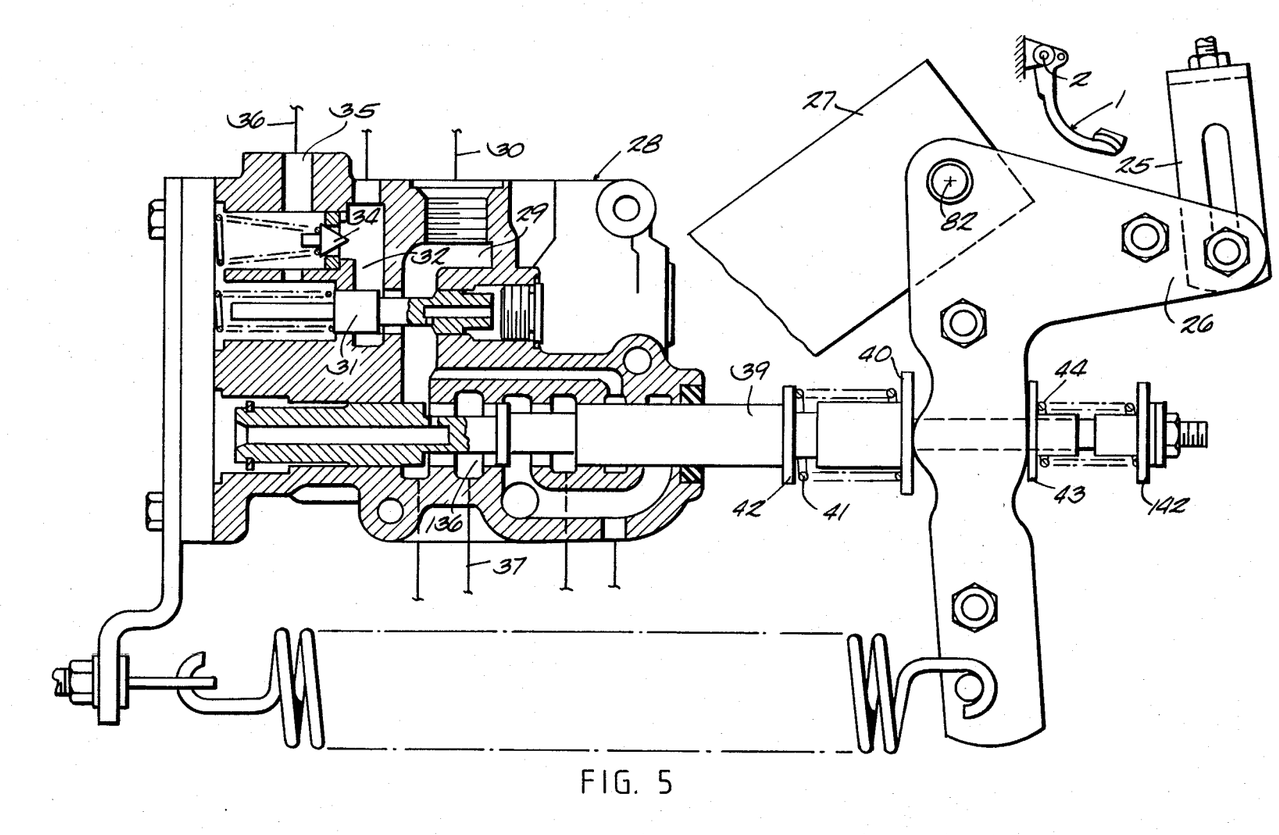
FIG. 5 is a side elvation view partially in section of the manually operated control valve in the position with the clutch pedal partially depressed.
Figure 6:
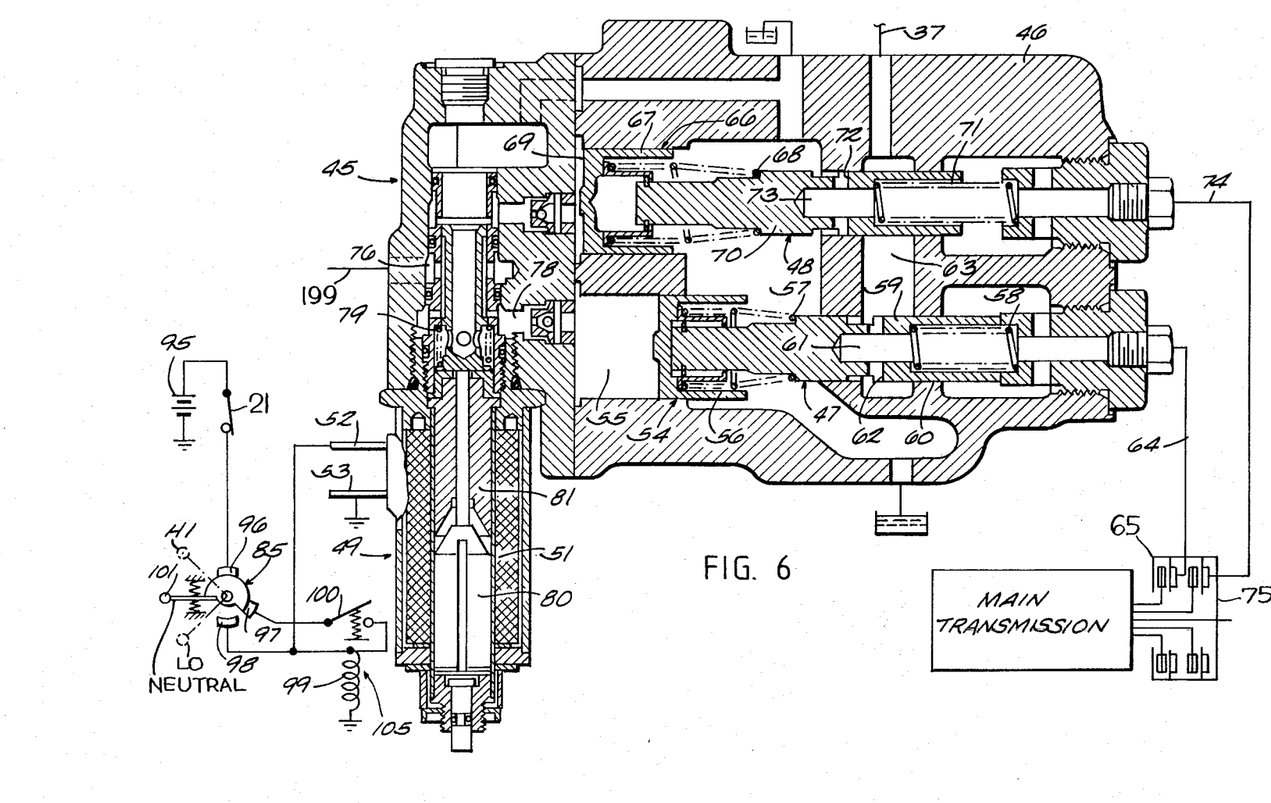
FIG. 6 is a cross-section view of the directional valve and the two modulating valves with a low speed modulating valve operating as when the control valve is inching.

Referring to FIGS. 5 and 6, the clutch pedal 1 is depressed pivoting the lever 26 on its pivotal axis 82 to withdraw spool 39 to the position for throttling fluid from the chamber 29 to the chamber 136. Continued movement of the spool 39 will disengage whichever one of the clutches 65, 75 is engaged by dumping the fluid in the clutch supply conduit 37. When the clutch pedal 1 is depressed the clutch control switch 21 is allowed to open. Opening of the switch 21 deenergizes the solenoid 49 in the directional valve (in the event the high speed clutch 75 is engaged at the time the clutch pedal is depressed) allowing the spring 79 to bias the armature 80, which includes a shiftable valve element, to the extended position as sown in FIG. 6. Opening of the switch 21 causes the directional valve to connect supply conduit 199 with the expansible chamber 55 operating the modulating valve 47 so when pedal is released the low clutch 65 will be energized and inching will progress.

Figure 7:
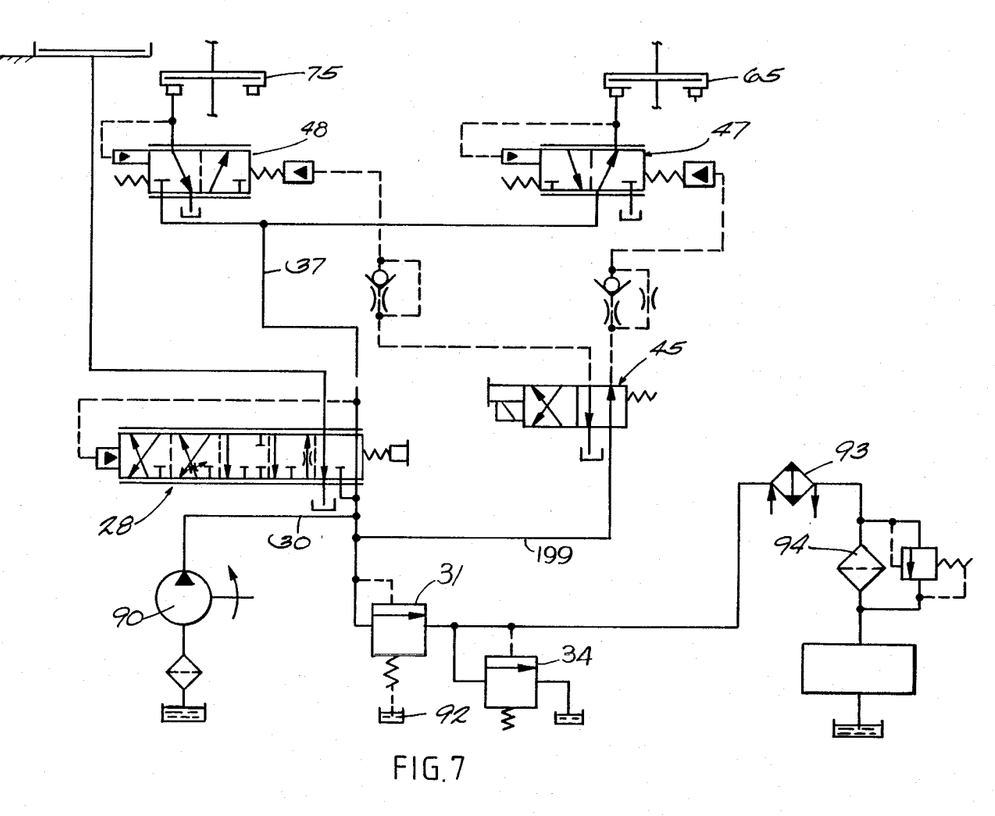
FIG. 7 is a schematic view of the hydraulic system including the control valve, the directional valve and two modulating valves.

Referring to FIG. 7, the pump 90 pressurizes fluid in the conduit 30 which is applied to the manual control valve 28. The relief valve 31 allows excess fluid to flow through cooler 93. Relief valve 34 allows fluid to return to sump 92 under cold oil conditions.

FIG. 6 illustrates the electrical diagram in which the battery 95 is connected through the clutch switch 21 to a manual control switch 85. A manual control member or lever 101 of the manual control switch 85 is biased to a neutral position as indicated. The switch lever 101 returns to this position when released manually. The switch lever 101 can be moved downwardly to the low position to de-energize the solenoid valve and thereby place the directional valve to the low range position. The solenoid directional valve 45 is connected through series connected switches 21 and 85.

When the manual control switch 85 is moved to the high range position the terminals 96, 97 and 98 are connected in the circuit. This energizes the relay coil 99 which in turn causes the relay switch 100 to close. When the lever 101 of the manual control switch 85 is released it returns automatically to its neutral position; however, the connection to the relay coil is maintained through the switch 100 and the relay switch 100 remains in the closed position. This continues to keep the solenoid valve 49 energized and the directional valve or solenoid valve 45 in the high range position for engaging the high speed range clutch 75.

The operation of the device will be described in the following paragraphs.

The switch 85 shown in FIG. 6, can be operated manually to cause the directional valve 45 to direct fluid to one or the other of the clutches 65, 75 by way of the modulating valves 47 or 48. Operation of the manual control switch 85 to the high speed range position energizes the relay coil 99 to hold the relay switch 100 in the closed position which energizes solenoid 49.

If it is desired to operate in the low speed modulating valve 47 the manual control switch 85 is moved to the low position which deenergizes the relay coil 99 and the solenoid coil 51 of the directional valve 45. The lever 101 is then allowed to return to the neutral position as illustrated in solid lines. Deenergizing of the relay coil 99 and returning the lever 101 to the neutral position deenergizes the solenoid coil 51 allowing the spring 79 to bias the armature 80 downwardly to a position directing pressure fluid to accumulator 55 of the low speed modulating valve 47.

The solenoid valve is automatically placed in a low speed operating mode when the clutch pedal 1 is depressed as when inching the tractor. Depressing the clutch pedal 1 opens the switch 21 which, in turn, deenergizes the relay coil 99 of the relay 105 and also deenergizes the solenoid coil 51. With the solenoid coil 51 deenergized, spring 79 biases the armature 80 to a position allowing the low speed modulating valve 47 to direct pressure fluid to the clutch actuating hydraulic circuit or conduit 64.

The embodiments of the invention in which an exclusive property or privilege is claimed are defined as follows:

1. In a vehicle having an operator's station, a clutch pedal at the operator's station and a change speed transmission having hydraulically operated high and low speed clutches, an electrohydraulic transmission control system comprising:
   a source of pressurized fluid,
   a source of electrical energy,
   a fluid supply control valve connected to said source of pressurized fluid and having a shiftable flow control element operatively connected to said clutch pedal,
   pilot operated low and high speed clutch valves connected in fluid receiving relation to said control valve and in fluid delivery relation to said low and high speed clutches, respectively, each of said valves including a flow control element, a fluid pressure chamber and a shiftable plunger in the pressure chamber operable to shift the associated flow control element when said chamber is supplied pressurized fluid,
   a solenoid valve connected to said source of pressurized fluid and to said pressure chambers and including a shiftable valve element resiliently biased to a low speed position in which pressurized fluid is supplied to said pressure chamber associated with the low speed clutch valve flow control element to position the latter to direct pressurized fluid to said low speed clutch, said solenoid valve including an electric coil and an armature which shifts, when said coil is electrically energized, to move said shiftable valve element to a high speed position in which pressurized fluid is supplied to said pressure chamber associated with said high speed clutch valve flow control element to position the latter to direct pressurized fluid to said high speed clutch, and
   an electric control circuit interconnecting said source of electrical energy and said solenoid valve for controlling operation of the latter including
      an electric relay operated switch,
      an electric relay operable upon electrical energization to close said relay operated switch,
      a clutch pedal operated switch shiftable from a normally closed position to an open position when said pedal is operated, and
      a manually operated speed selecting switch intermediate said clutch pedal operated switch and said relay operated switch, said speed selecting switch having a low speed position of adjustment in which the speed selecting switch is open interrupting flow of electricity to said relay and to said relay operated switch whereby the latter opens, said manually operated speed selecting switch having a high speed position of adjustment in which said relay is electrically energized to close said relay operated switch and electricity flows to said solenoid valve electric coil and to said relay operated switch and said manually operated speed selecting switch having a neutral position of adjustment in which flow of electricity is permitted therethrough to said relay operated switch, said relay operated switch opening to cause said valve element of said solenoid valve to occupy its low speed position when said clutch pedal operated switch is in its open position.

2. The combination of claim 1 wherein said manually operated speed selecting switch includes a manually operated member biased to a neutral position and manually shiftable in opposite directions from said neutral position to low speed and high speed selecting positions, said manually operated member automatically returning upon release to its neutral position from its low and high speed selecting positions, in said neutral position of said manually operated member said relay operated switch remaining open if said manually operated member was just previously in its low speed selecting position and said relay operated switch remaining closed if said manually operated member was just previously in its high speed selecting position.

* * * * *